United States Patent
Lim

(10) Patent No.: US 12,221,167 B2
(45) Date of Patent: Feb. 11, 2025

(54) AUTONOMOUS DRIVING VEHICLE

(71) Applicant: SEJIN-IGB CO., LTD., Chungcheongnam-do (KR)

(72) Inventor: Sun Ho Lim, Chungcheongnam-do (KR)

(73) Assignee: SEJIN-IGB CO., LTD., Chungcheongnam-do (KR)

( * ) Notice: Subject to any disclaimer, the term of this patent is extended or adjusted under 35 U.S.C. 154(b) by 87 days.

(21) Appl. No.: 17/789,346

(22) PCT Filed: Oct. 23, 2020

(86) PCT No.: PCT/KR2020/014552
§ 371 (c)(1),
(2) Date: Jun. 27, 2022

(87) PCT Pub. No.: WO2021/141217
PCT Pub. Date: Jul. 15, 2021

(65) Prior Publication Data
US 2023/0052470 A1 Feb. 16, 2023

(30) Foreign Application Priority Data
Jan. 8, 2020 (KR) .................. 10-2020-0002447

(51) Int. Cl.
*B60G 3/01* (2006.01)
*B60W 30/10* (2006.01)
(Continued)

(52) U.S. Cl.
CPC ............... *B62D 3/12* (2013.01); *B60G 3/01* (2013.01); *B62D 7/18* (2013.01); *B62D 17/00* (2013.01);
(Continued)

(58) Field of Classification Search
CPC . B62D 3/12; B62D 7/18; B62D 17/00; B60G 3/01; B60G 2200/10;
(Continued)

(56) References Cited

U.S. PATENT DOCUMENTS 6,902,176 B2 6/2005 Gottschalk
7,530,583 B2 5/2009 Gottschalk
(Continued)

FOREIGN PATENT DOCUMENTS

CN 103958326 A * 7/2014 ............... B60G 3/06
EA 001082 B1 * 10/2000
(Continued)

OTHER PUBLICATIONS

Description Translation for EA 001082 from Espacenet (Year: 2000).*
(Continued)

*Primary Examiner* — Jason D Shanske
*Assistant Examiner* — Daniel M. Keck
(74) *Attorney, Agent, or Firm* — CALDERON SAFRAN & WRIGHT P.C.

(57) ABSTRACT

Disclosed is an autonomous driving vehicle including a front wheel support connected to a front wheel as one body and supporting the front wheel, and a knuckle arm angle adjustment assembly having one side to which a knuckle arm is connected, the knuckle arm moving with the front wheel during steering the front wheel, and knuckle arm angle adjustment assembly being coupled to one side of the front wheel support to be capable of angle adjustment for setting an inclination angle of the knuckle arm.

15 Claims, 19 Drawing Sheets

(51) Int. Cl.
*B62D 3/12* (2006.01)
*B62D 7/18* (2006.01)
*B62D 17/00* (2006.01)

(52) U.S. Cl.
CPC ...... *B60G 2200/10* (2013.01); *B60G 2200/44* (2013.01); *B60G 2204/4232* (2013.01)

(58) Field of Classification Search
CPC .......... B60G 2200/422; B60G 2200/44; B60G 2204/14; B60G 2204/4232; B60G 2204/61; B60G 2300/50; B60Y 2304/07; B60W 30/10
See application file for complete search history.

(56) References Cited

U.S. PATENT DOCUMENTS

| | | | |
|---|---|---|---|
| 10,458,527 | B2 | 10/2019 | Lim |
| 11,597,438 | B1* | 3/2023 | Payne .................... B62D 5/061 |
| 2004/0150181 | A1* | 8/2004 | Gottschalk ............... B62D 7/18 280/93.512 |
| 2008/0000706 | A1* | 1/2008 | Tashiro ................ B60K 7/0007 464/83 |
| 2012/0098221 | A1* | 4/2012 | Michel ................... B62D 7/146 280/86.758 |
| 2015/0069730 | A1 | 3/2015 | Kawauchi et al. |
| 2018/0370565 | A1 | 12/2018 | White et al. |
| 2021/0245797 | A1* | 8/2021 | Sardes .................. B60G 13/16 |

FOREIGN PATENT DOCUMENTS

| | | | |
|---|---|---|---|
| EP | 3689711 A1 | | 8/2020 |
| JP | 2-3574 A | | 1/1990 |
| JP | 2007054388 A | | 3/2007 |
| JP | 2011251632 A | | 12/2011 |
| JP | 2019199952 A | | 11/2019 |
| KR | 19990035386 A | | 5/1999 |
| KR | 20000054489 A | | 9/2000 |
| KR | 20040070424 A | | 8/2004 |
| KR | 20090131389 A | | 12/2009 |
| KR | 2020140004901 U | | 9/2014 |
| KR | 20230019808 A1 | * | 2/2023 |
| WO | 2019065781 A1 | | 4/2019 |

OTHER PUBLICATIONS

Partial European Search Report of related European Patent Application No. 20912738.0 dated Jun. 7, 2023.
Office Action of Japanese Patent Application No. 2022-5417756 dated May 23, 2023.

* cited by examiner

AUTONOMOUS DRIVING VEHICLE

CROSS-REFERENCE TO RELATED APPLICATIONS AND CLAIM TO PRIORITY

This application is a national stage application of International Application No. PCT/KR2020/014552 filed Oct. 23, 2020, which claims priority to Korean Patent Application No. 10-2020-0002447 filed Jan. 8, 2020, the disclosures of which are incorporated herein by reference and to which priority is claimed.

FIELD OF THE INVENTION

The present inventive concept relates to an autonomous driving vehicle, and more particularly, to an autonomous driving vehicle in which a knuckle arm inclination angle set operation with respect to a vehicle width or a vehicle length may be accurately, easily, and quickly performed, compared with the related art, so that not only mass-production of vehicles may be secured, but also a path deviation error during autonomous steering and driving may be reduced.

BACKGROUND OF THE INVENTION

A steering system (apparatus) is mounted on a vehicle. A steering system is a kind of system that enables a vehicle to turn as a wheel (front wheel) is turned when a handle called a steering wheel (wheel) is turned.

The steering system includes two types of methods as shown in FIGS. 1 and 2.

An Ackermann-Jantoud type is the first type and schematically illustrated in FIG. 1.

The Ackermann-Jantoud type of FIG. 1 is a 4-bar link type, that is, four bars including a pair of knuckle arms 10, a tie rod 11, and a main rod 12 are connected by a link to operate.

In this state, the knuckle arms are generated set to an angle in which virtual lines A and B connecting the pair of knuckle arms meet at the center of a rear axle.

When a handle that is not illustrated is rotated, a steering shaft connected to the handle is rotated, a pinion gear connected to the steering shaft is rotated, and the tie rod 11 is moved through a rack gear connected to the pinion gear, so that the knuckle arms are driven.

Then, starting from a wheel pivot (not shown), the front wheels 20 are rotated and rear wheels 30 follow. In this state, among the front wheels 20, the right wheel illustrated in FIG. 1 turns more than the left wheel. Only then, the vehicle may turn with respect to a point O.

Meanwhile, the Ackermann-Jantoud type of FIG. 1 has been widely used due to its merits of being easy to implement as a simple structure of a 4-bar link type as described above, and steering the linear motion of the tie rod 11 with only a rotational motion in the form of a 4-bar link type.

However, when steering is made from a solid line to a dashed line in FIG. 1, unless inclined at an angle, the rotation center is deviated from a rear axle extension line and slipping occurs. However, when the tie rod 11 is restricted to perform a linear motion only, a desired steering repulsive force may not be obtained, and thus, during steering, the rotation center necessarily deviates from the rear axle extension line. Accordingly, for the Ackermann-Jantoud type of FIG. 1, a certain level of slipping is bound to occur.

Although the Ackermann-Jantoud type of FIG. 1 has widely been used because normal vehicles drive a relatively curved road, and slipping may be compensated for by a complement, such as suspension and the like, and person's judgement and the like, the Ackermann-Jantoud type of FIG. 1 has been known to be theoretically unable to remove the slipping.

A Davis type expressed in a schematic drawing of FIG. 2 is the second type.

This type has a structure to theoretically exclude slipping under all steering conditions, compared with the Ackermann-Jantoud type of FIG. 1.

However, as many sliding portions 50 are mounted and there are many sliding linear motions, and thus, friction and abrasion increase and precision is degraded so that this type is not known to be used well.

Meanwhile, when any of the above-described types is adopted, for smooth steering and driving, the knuckle arm inclination angle set or setting with respect to a vehicle width W or a vehicle length L are most important. Only then, vehicles, in particular, autonomous driving vehicles that are driven without a driver, may reduce a path deviation error during autonomous steering and driving.

Conventionally, however, a fine screw adjustment method using a double nut has been adopted to set an inclination angle of the knuckle arms with respect to the vehicle width W or the vehicle length L, but since the knuckle arm inclination angle set operation is not easy and takes a long time. When this classical method is applied, as it is, to autonomous driving vehicles, each of vehicles having different vehicle widths W or different vehicle lengths L requires resetting so that mass production may be degraded. Considering the above, there is a need to develop technology about a new concept of an autonomous driving vehicle that is previously unknown.

SUMMARY OF THE INVENTION

Provided is an autonomous driving vehicle in which a knuckle arm inclination angle set operation with respect to a vehicle width or a vehicle length may be accurately, easily, and quickly performed, compared with the related art, so that not only mass-production of vehicles may be secured, but also a path deviation error during autonomous steering and driving may be reduced.

According to the present inventive concept, as a knuckle arm inclination angle set operation with respect to a vehicle width or a vehicle length may be accurately, easily, and quickly performed, compared with the related art, not only mass production of vehicles may be achieved, but also a path deviation error during autonomous steering and driving may be reduced.

DETAILED DESCRIPTION OF THE PREFERRED EMBODIMENT(S)

Figure 1:
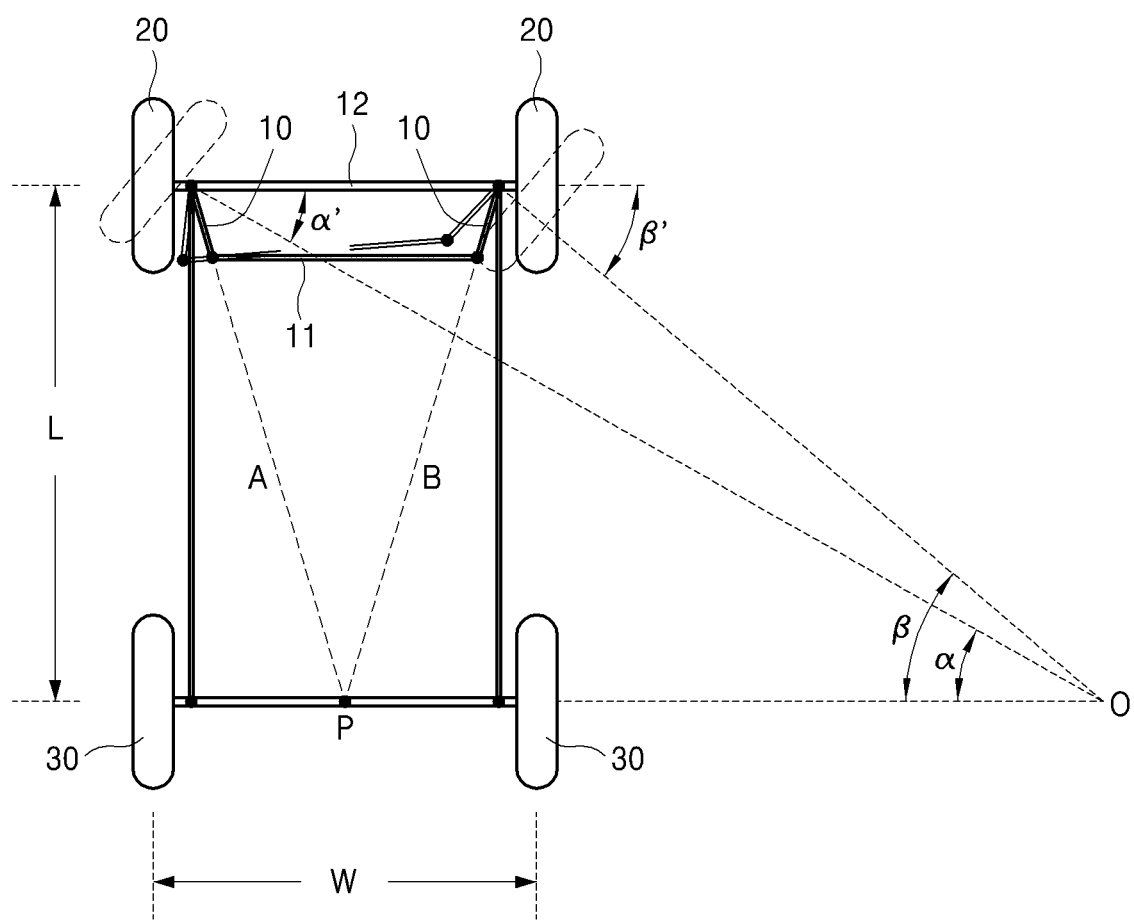
FIG. 1 is a schematic structural diagram of a steering system of an Ackermann-Jantoud type.

According to an aspect of the present inventive concept, an autonomous driving vehicle includes a front wheel support connected to a front wheel as one body and supporting the front wheel, and a knuckle arm angle adjustment assembly having one side to which a knuckle arm is connected, the knuckle arm moving with the front wheel during steering the front wheel, and knuckle arm angle adjustment assembly being coupled to one side of the front wheel support to be capable of angle adjustment for setting an inclination angle of the knuckle arm.

The knuckle arm angle adjustment assembly may include a sawtoothed knuckle arm angle adjustment assembly that is capable of angle adjustment by a preset angle with respect to the front wheel support through a sawtooth type method.

The sawtoothed knuckle arm angle adjustment assembly may include an assembly body including an arm connection portion to which the knuckle arm is connected, a rotation shaft coupled to the assembly body to have both end portions of the rotation shaft exposed, and forming a rotation axis of the assembly body, an angle adjustment module connected to the rotation shaft forming one body, and having a first serration formed on one side of the angle adjustment module, and a module restriction portion restricting the angle adjustment module to one side of the front wheel support.

The module restriction portion may include a module restriction main block having a second serration that is engaged with the first serration of the angle adjustment module, and a main fastening member fastening the module restriction main block to the front wheel support.

The module restriction portion may further include a module restriction sub-block supporting the module restriction main block at a side of the module restriction main block, a block fastening member fastening the module restriction sub-block and the module restriction main block, and a sub-fastening member fastening the module restriction sub-block to the front wheel support.

The front wheel support may include a support inner body disposed inside the front wheel, a lower shaft coupling portion connected to a lower portion of one side of the support inner body, and to which a lower end portion of the rotation shaft is coupled, an upper shaft coupling portion connected to an upper portion of the one side of the support inner body, and to which an upper end portion of the rotation shaft is coupled, a support outer body supporting the front wheel at a side opposite to the support inner body with the front wheel therebetween, and a plurality of body fastening members fastening the support outer body and the support inner body.

First and second through-holes, through which the main fastening member and the sub-fastening member pass, may be formed in the upper shaft coupling portion, and first and second fastening holes, through which the main fastening member and the sub-fastening member having passed through the first and second through-hole are fastened, may be formed in the module restriction main block and the module restriction sub-block, the first fastening hole being provided as a slot.

A step portion may be formed in a lower end portion of the upper shaft coupling portion that is contacted by the module restriction main block and the module restriction sub-block.

The autonomous driving vehicle may further include a vertical driving suspension connected to the assembly body through a rotation shaft of the knuckle arm angle adjustment assembly, and providing a shock-absorption force to a body of a vehicle by performing only a linear motion in a vertical direction to remove a change in a vehicle width.

The vertical driving suspension may be independently mounted on both of the front wheel and a rear wheel disposed at a side opposite to the front wheel.

The vertical driving suspension may include a suspension body, a spring coupled to the suspension body and performing shock-absorption in the vertical direction, a pair of coupling arms extending from the suspension body and coupled to both end portions of the assembly body, a lower head connected to a lower portion of the suspension body apart therefrom and coupled to a body frame, and an upper head connected to an upper portion of the suspension body apart therefrom and restricted to a front frame cover coupled to the body frame.

The autonomous driving vehicle may further include a steering motor generating a driving force to steer the front wheel, a pinion connected to the steering motor and rotated by the steering motor, and a rack gear-engaged with the pinion, and transmitting a rotational motion of the pinion as a linear motion.

The autonomous driving vehicle may further include a pair of knuckle arm support units each supporting the knuckle arm in an area of the front wheel, and a motion transmitting member coupled to the rack such that both end portions of the motion transmitting member are rotatably connected to the pair of knuckle arm support units, and transmitting a linear motion of the rack as a turning motion of the knuckle arm.

The knuckle arm support unit may include an arm penetration support portion through which the knuckle arm passes and is supported thereon, a unit supporter supporting the arm penetration support portion outside the arm penetration support portion, and a rotating head portion rotatably connected to the unit supporter and disposed and fixed to a penetration portion formed in an end portion of the motion transmitting member.

The pinion may include a pinion body having a disc shape, and a plurality of power transmission pins connected to the pinion body at equal intervals in a circumferential direction of the pinion body, and providing rotational power mutually corresponding to shapes of teeth formed on the rack.

The autonomous driving vehicle may further include a pair of rear wheel driving portions respectively connected to a pair of rear wheels disposed at a side opposite to the front wheel, and providing a driving force to the pair of rear wheels, a common driving force providing portion commonly providing a driving force to drive the pair of rear wheel driving portions, and a rear wheel motion transmitting portion connected between the common driving force providing portion and each of the pair of rear wheel driving portions, and transmitting a motion of the common driving force providing portion to the pair of rear wheel driving portions.

The common driving force providing portion may be provided as a modular composite device of an engine for generating a driving force, a reducer for reducing a speed of the engine, and a differential gear.

The rear wheel motion transmitting portion may include a Schmidt coupling.

In order to fully understand the operational advantages of the present inventive concept and the objectives achieved by the implementation of the present inventive concept, the accompanying drawings illustrating preferred embodiments of the present inventive concept and the contents described in the accompanying drawings are referred to.

Hereinafter, the inventive concept will be described in detail by explaining preferred embodiments of the inventive concept with reference to the attached drawings. Like reference numerals in the drawings denote like elements.

The attached drawings for illustrating preferred embodiments of the disclosure are referred to in order to gain a sufficient understanding of the disclosure, the merits thereof, and the objectives accomplished by the implementation of the disclosure.

Hereinafter, the disclosure will be described in detail by explaining preferred embodiments of the disclosure with reference to the attached drawings. Like reference numerals in the drawings denote like elements.

Figure 3:
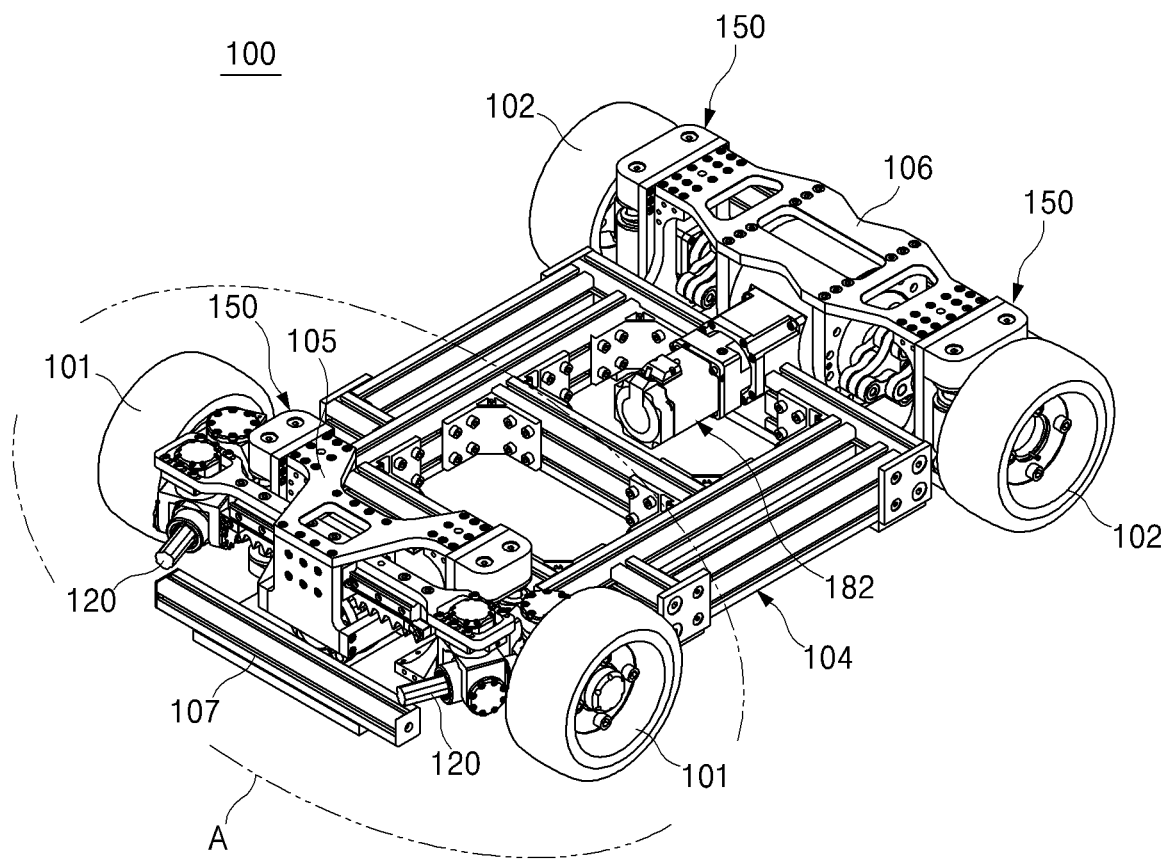
FIG. 3 is a perspective view of an autonomous driving vehicle according to an embodiment of the inventive concept.
Figure 4:
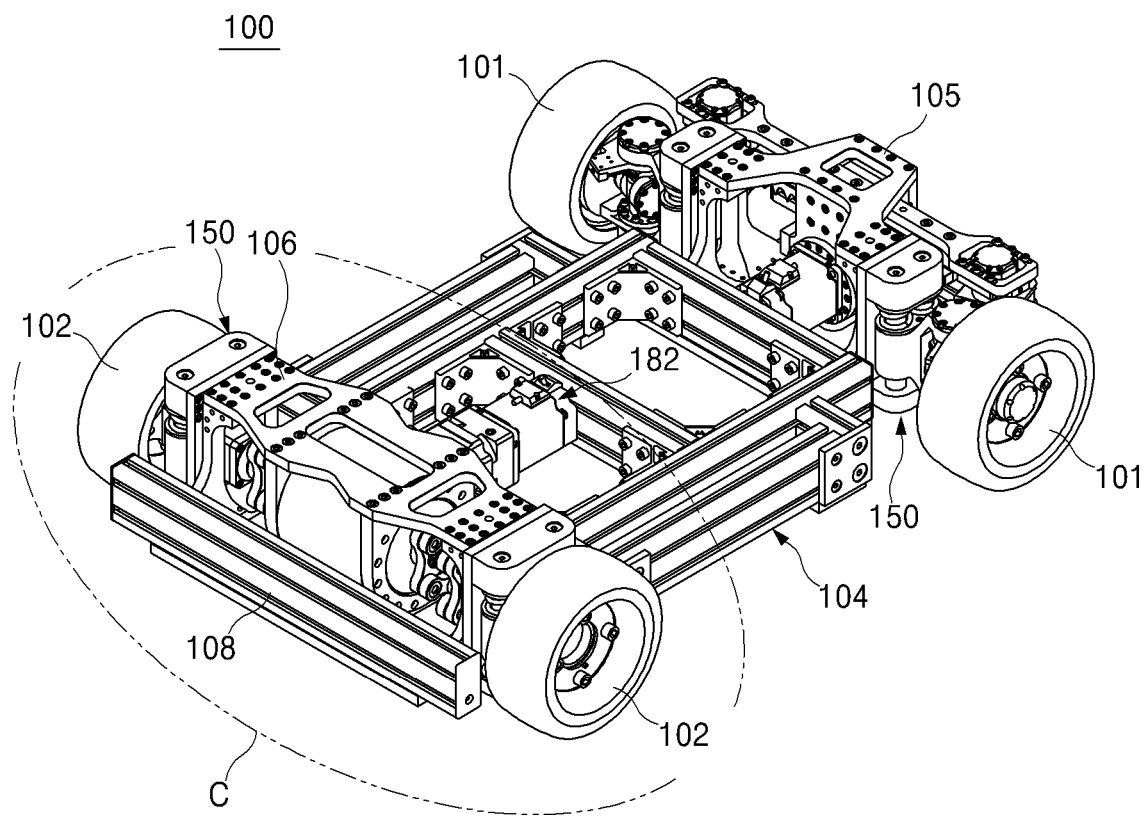
FIG. 4 is a rear perspective view of FIG. 3.
Figure 5:
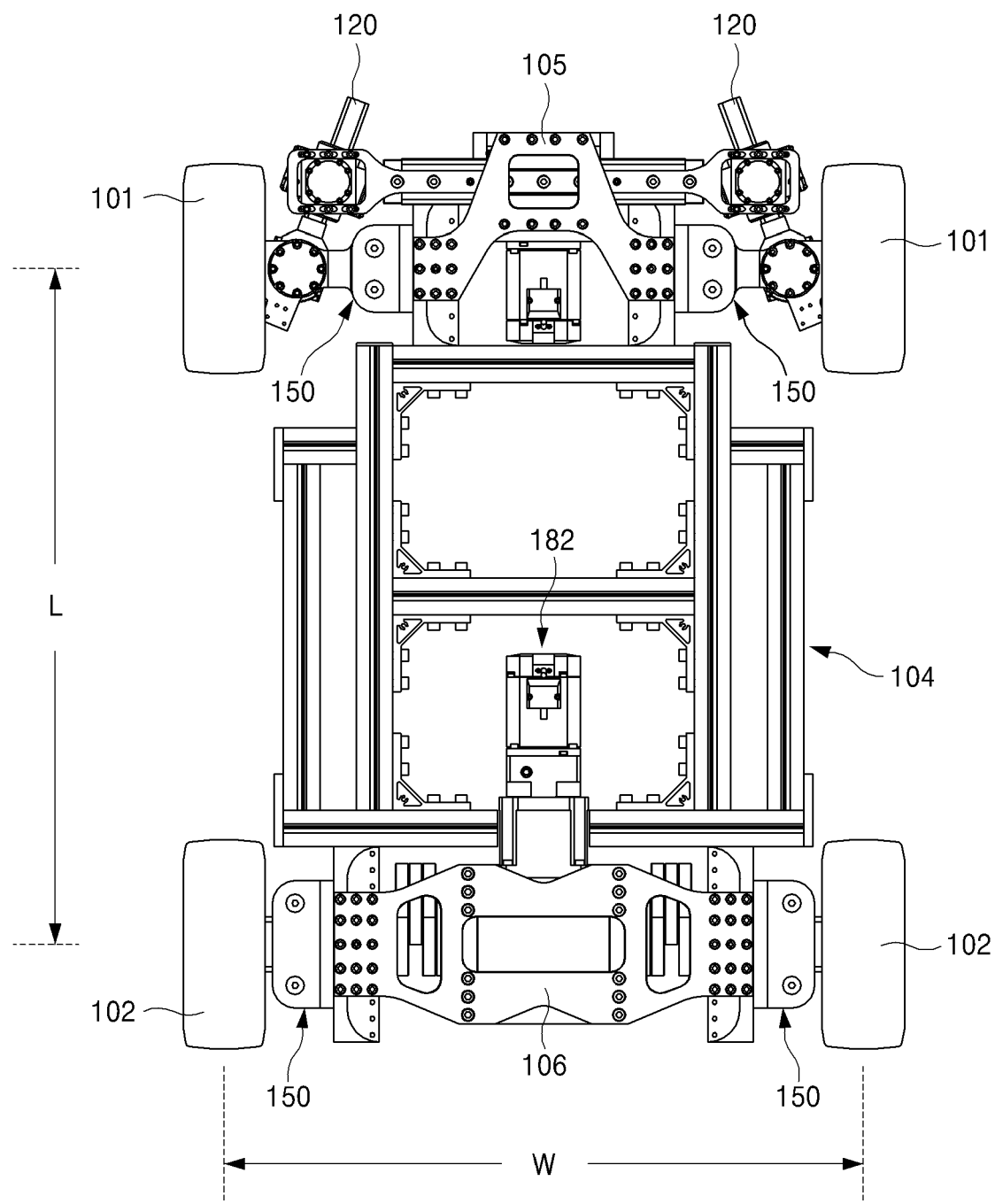
FIG. 5 is a plan view of FIG. 3.
Figure 6:
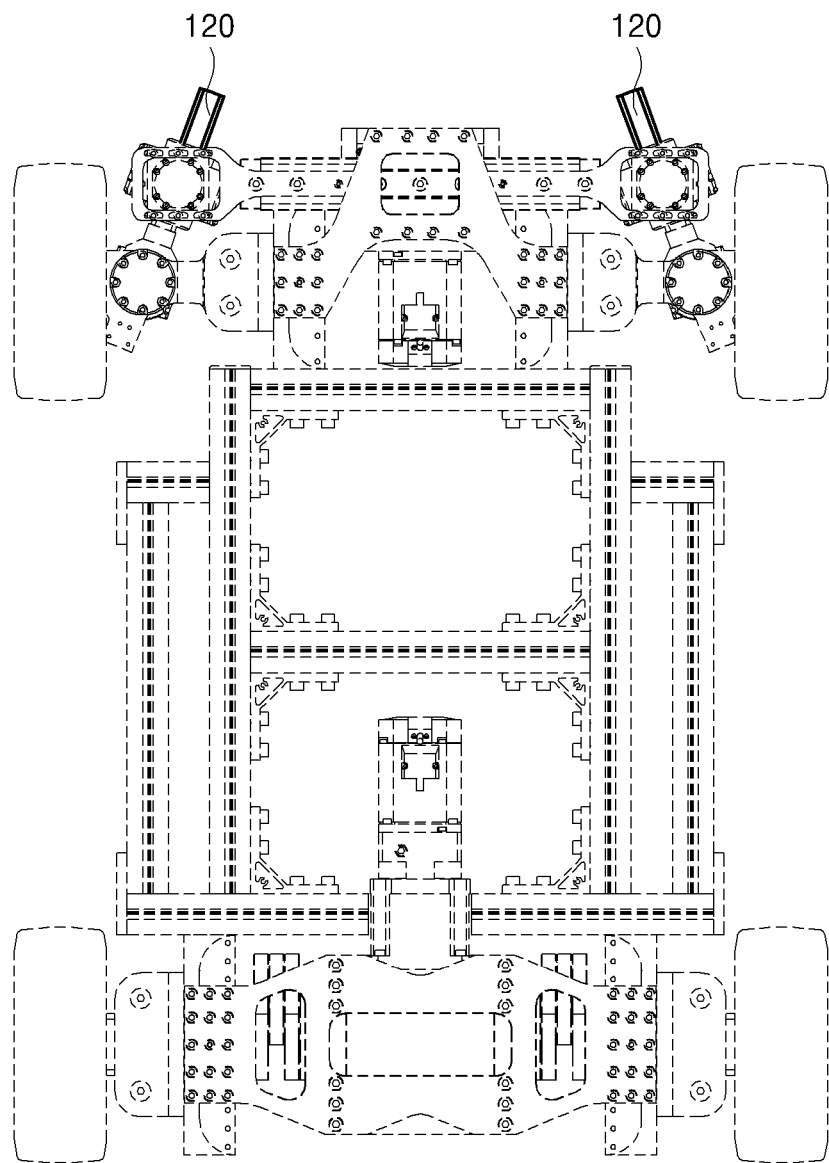
FIG. 6 is a plan view in which, in FIG. 5, to emphasize the knuckle arm, the other parts except a knuckle arm are indicated by dashed lines.
Figure 7:
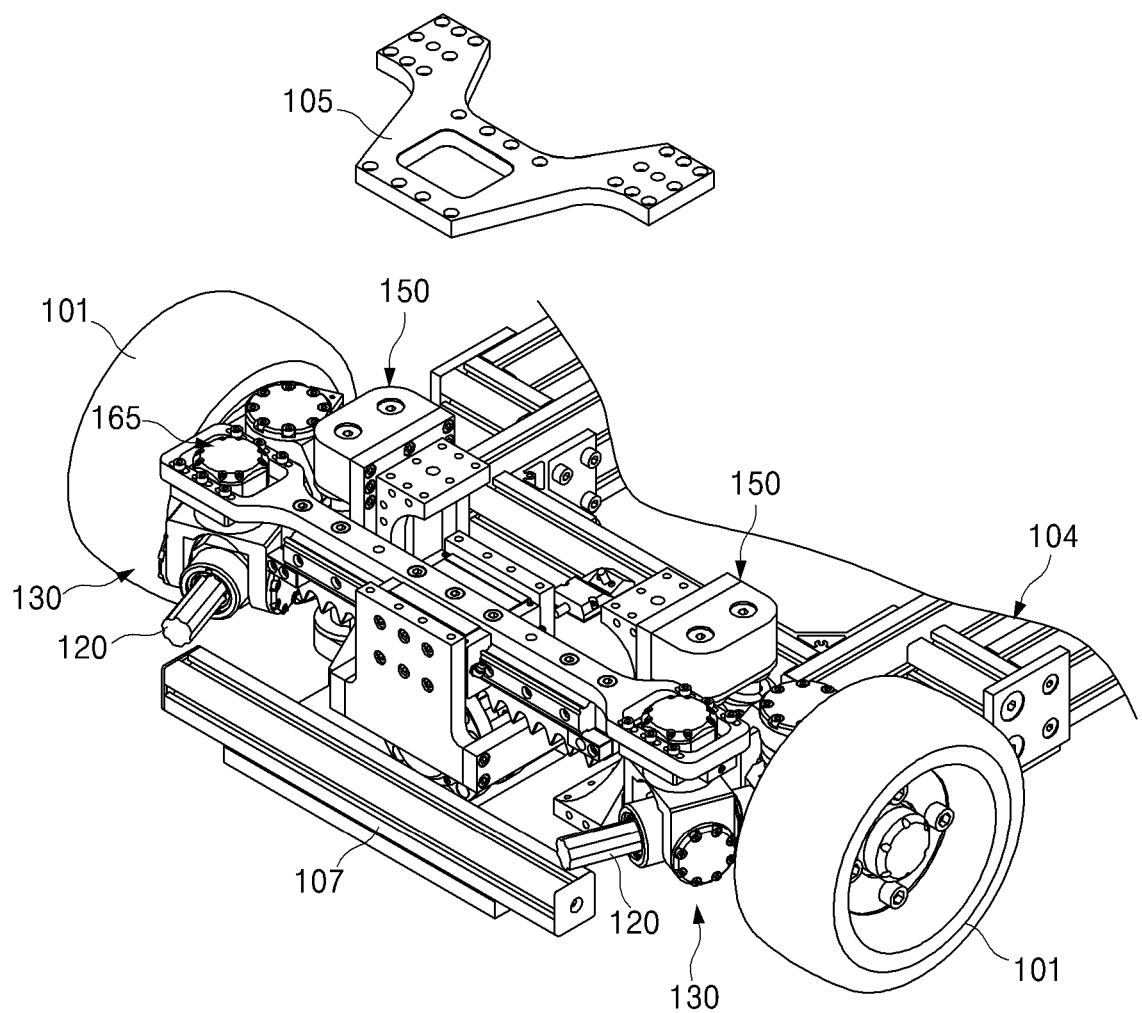
FIG. 7 is an enlarged view of a region A of FIG. 3.
Figure 8:
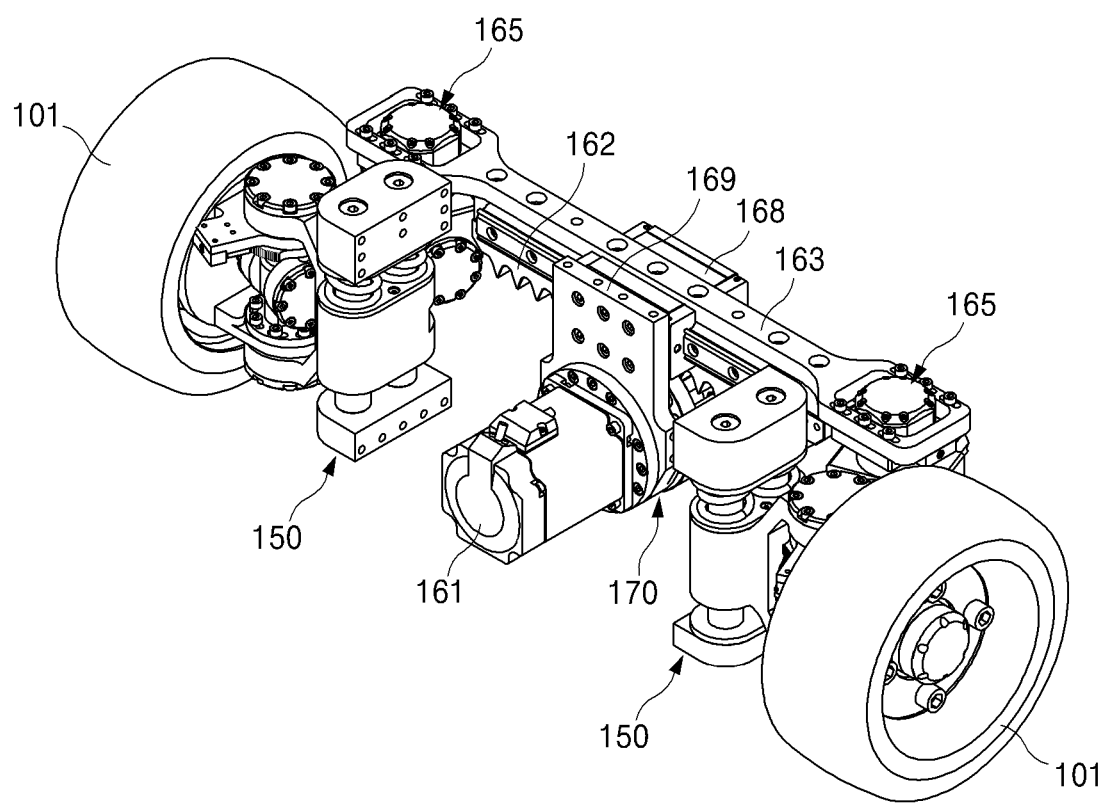
FIG. 8 illustrates the opposite side after removing parts of a body frame are removed in FIG. 7.
Figure 9:
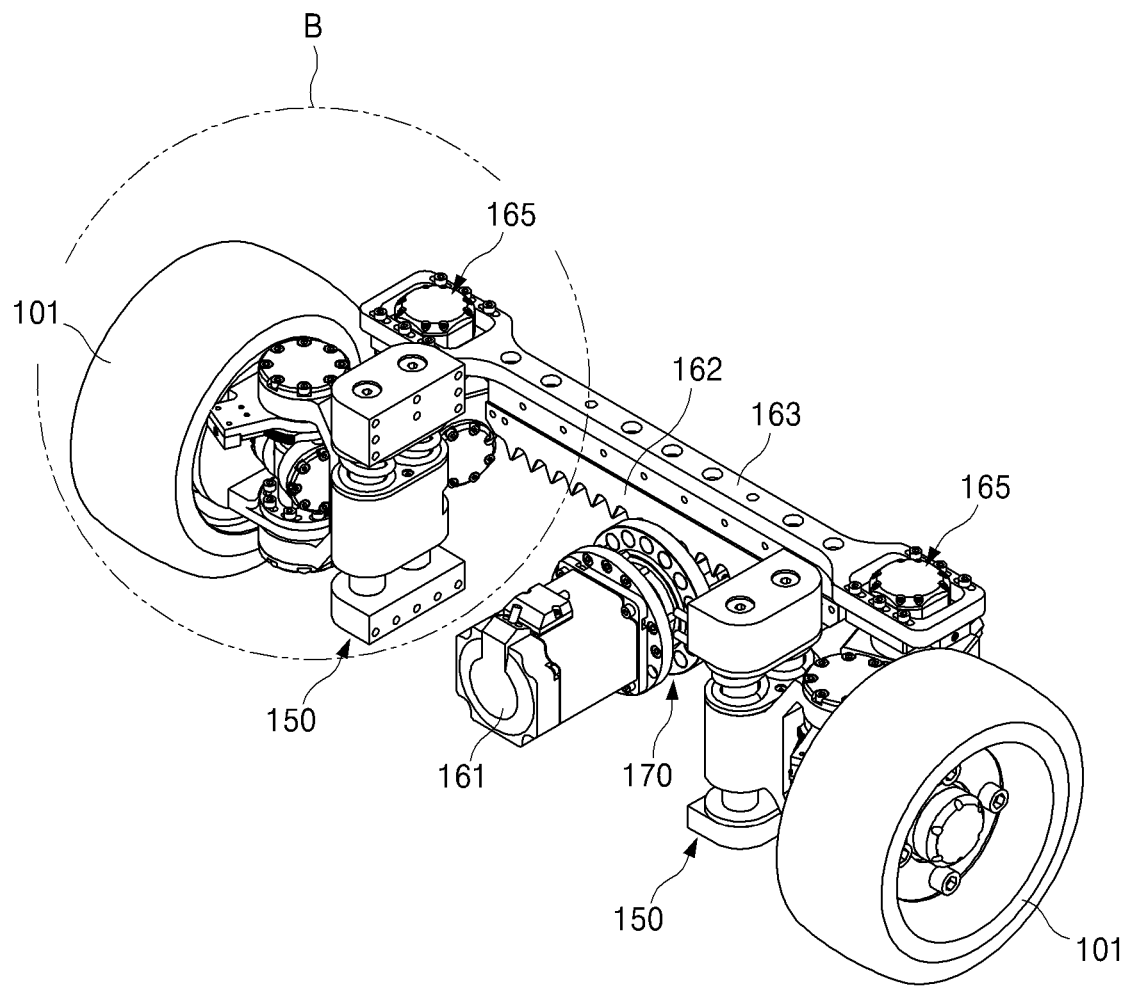
FIG. 9 illustrates a state of removing a linear guide in FIG. 8.
Figure 10:
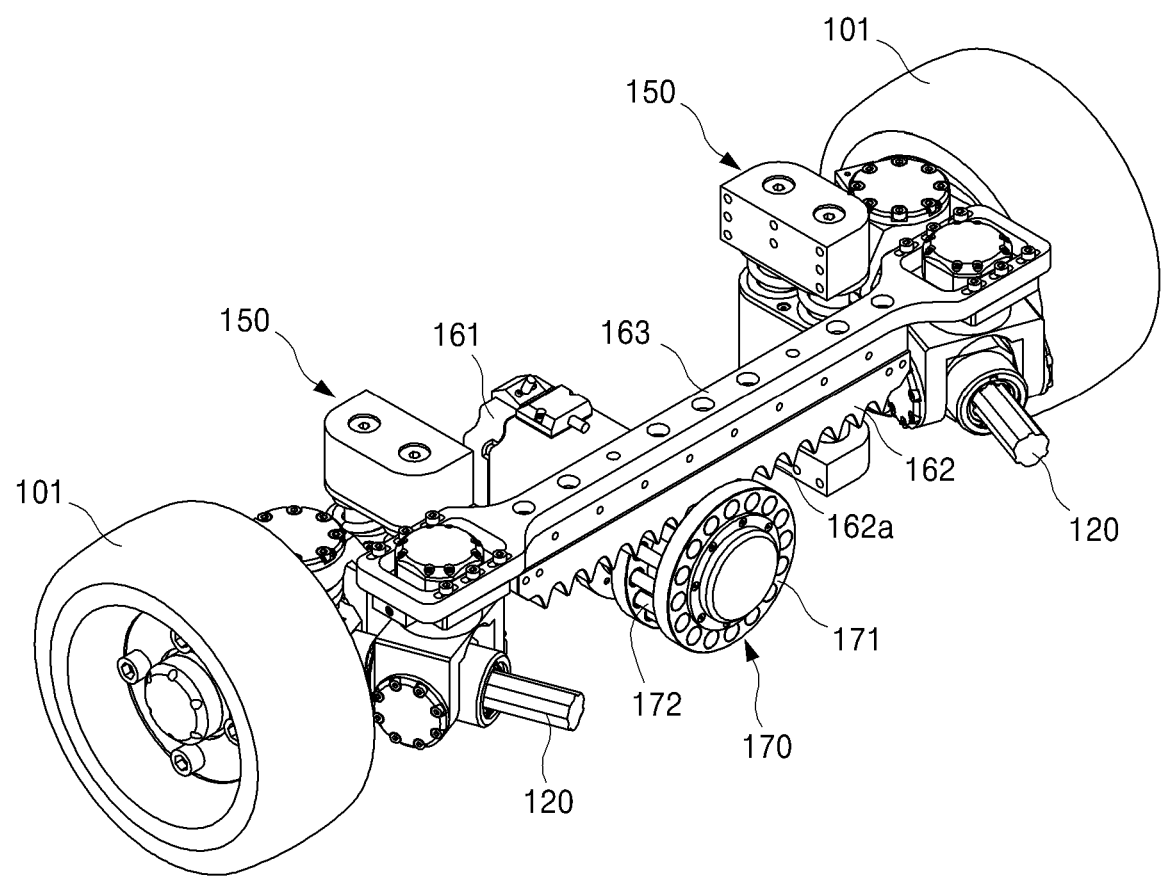
FIG. 10 illustrates the opposite side of FIG. 9.
Figure 11:
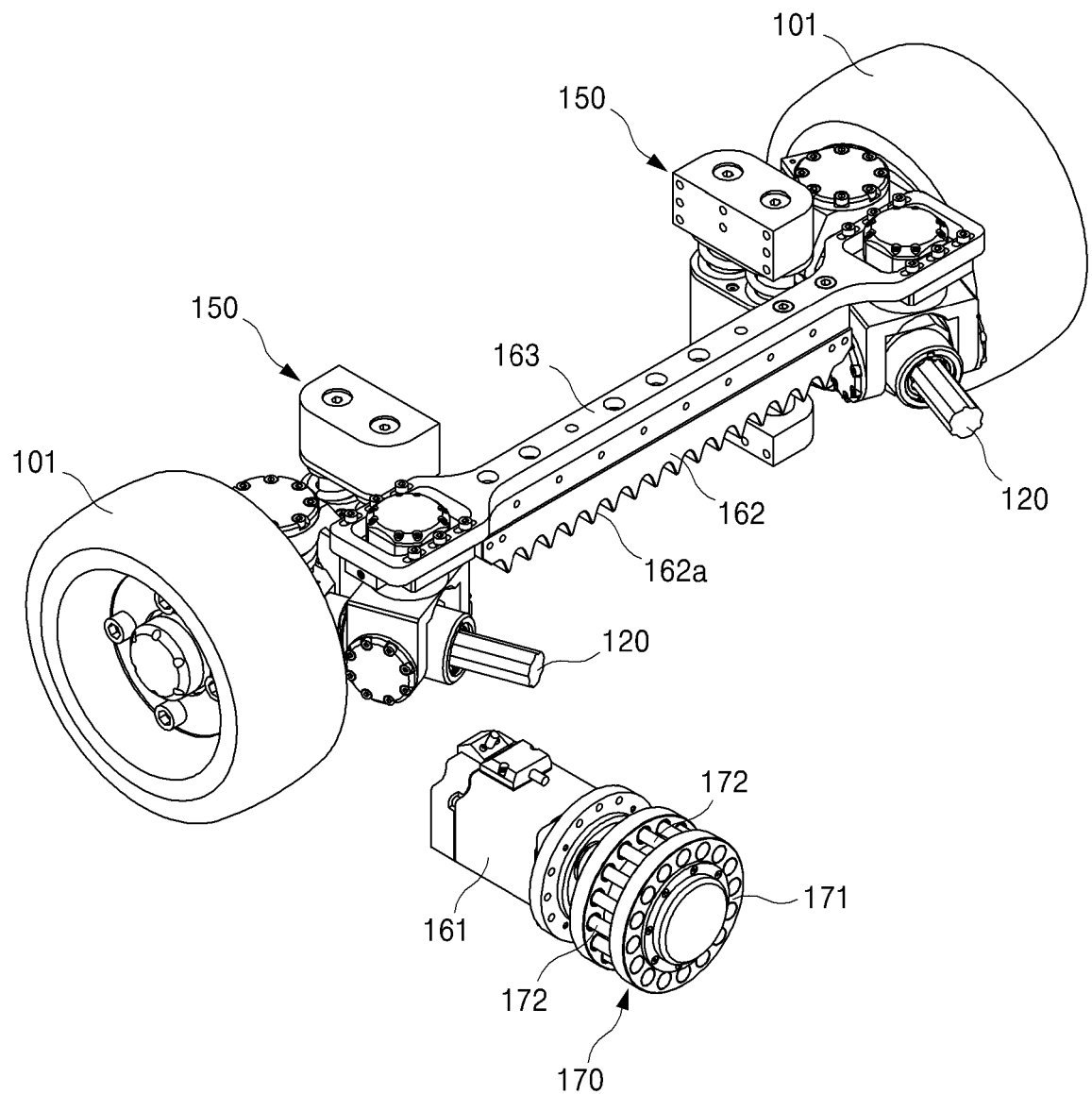
FIG. 11 is a partially exploded view of FIG. 10.
Figure 12:
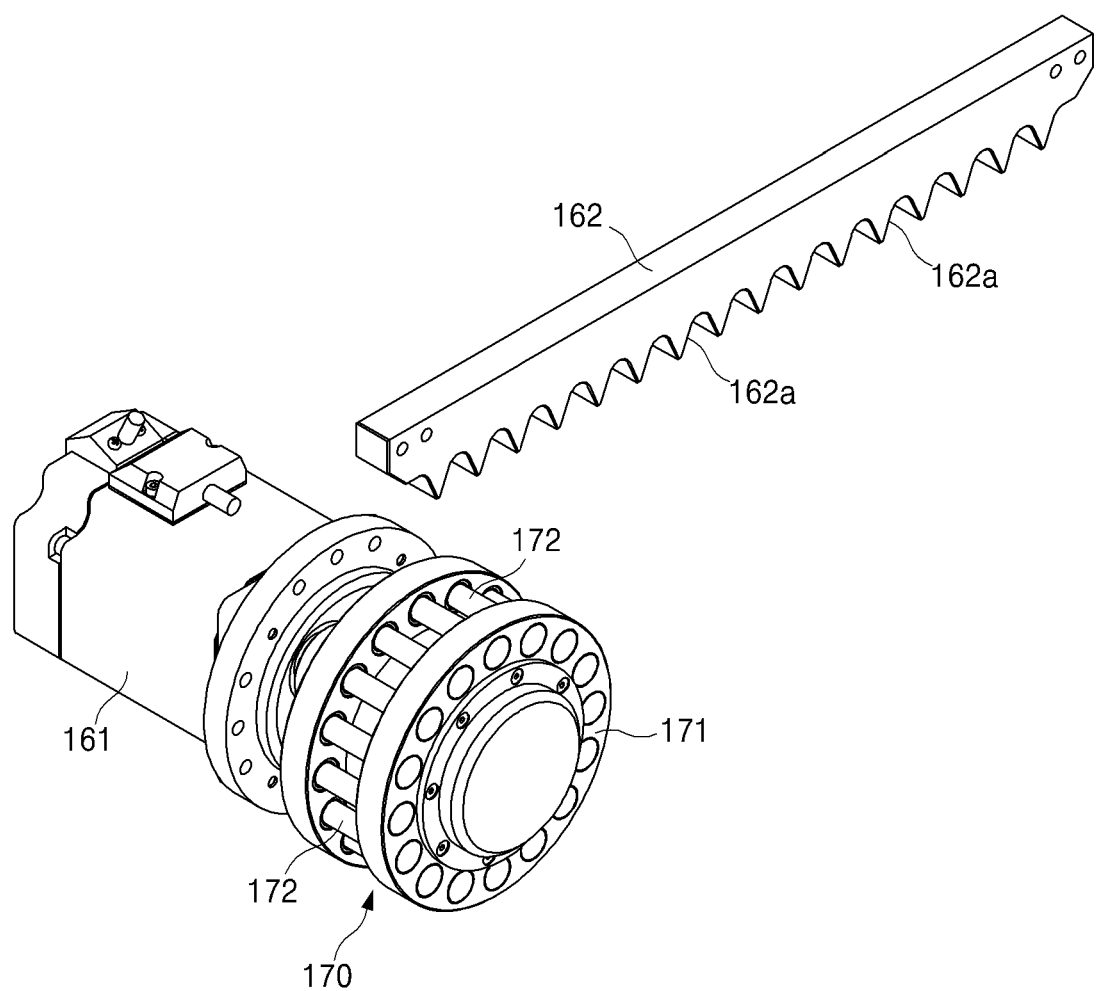
FIG. 12 is an exploded view of a pinion and a rack in FIG. 11.
Figure 13:
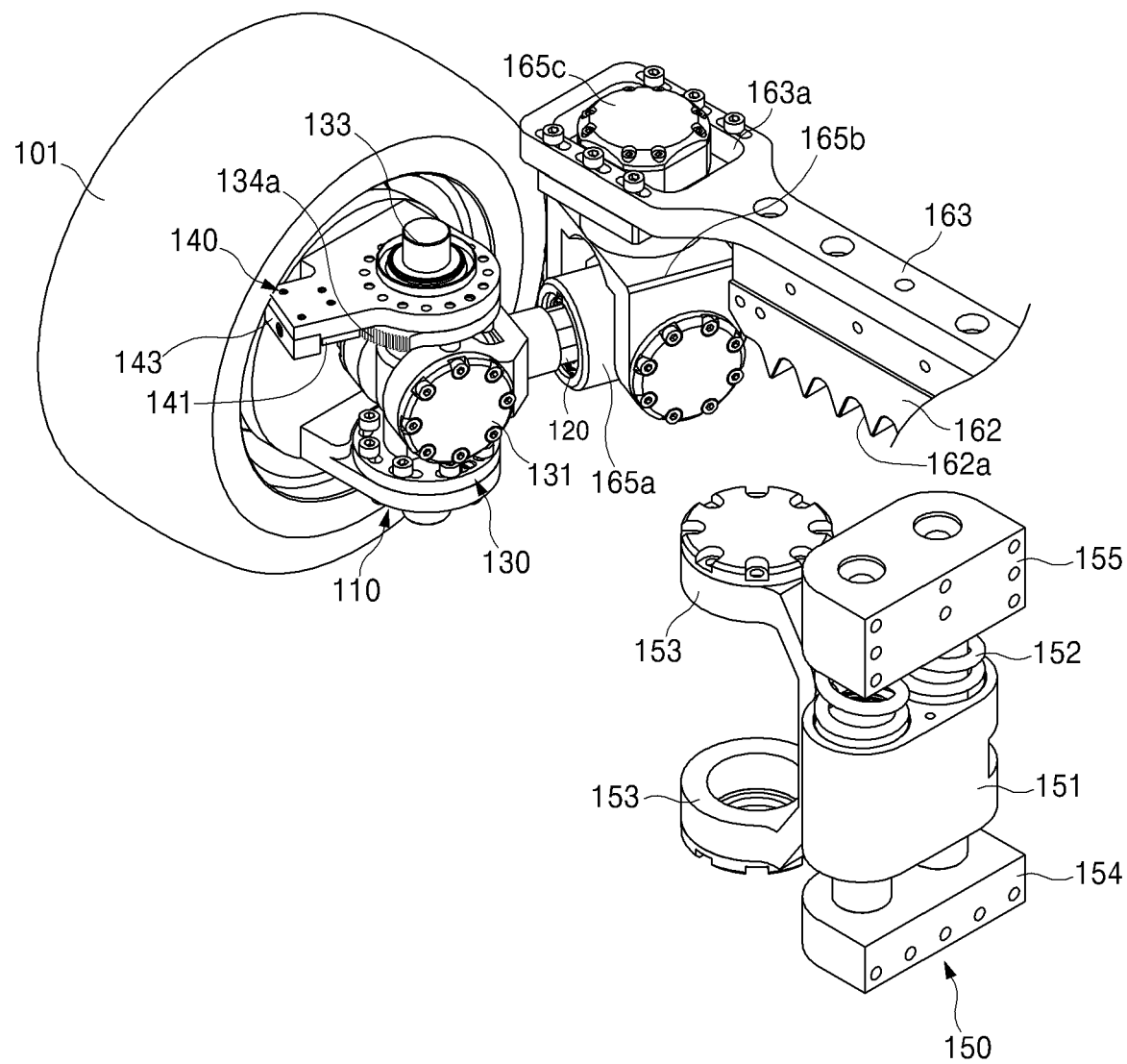
FIG. 13 is a partially exploded enlarged view of a region B of FIG. 9.
Figure 14:
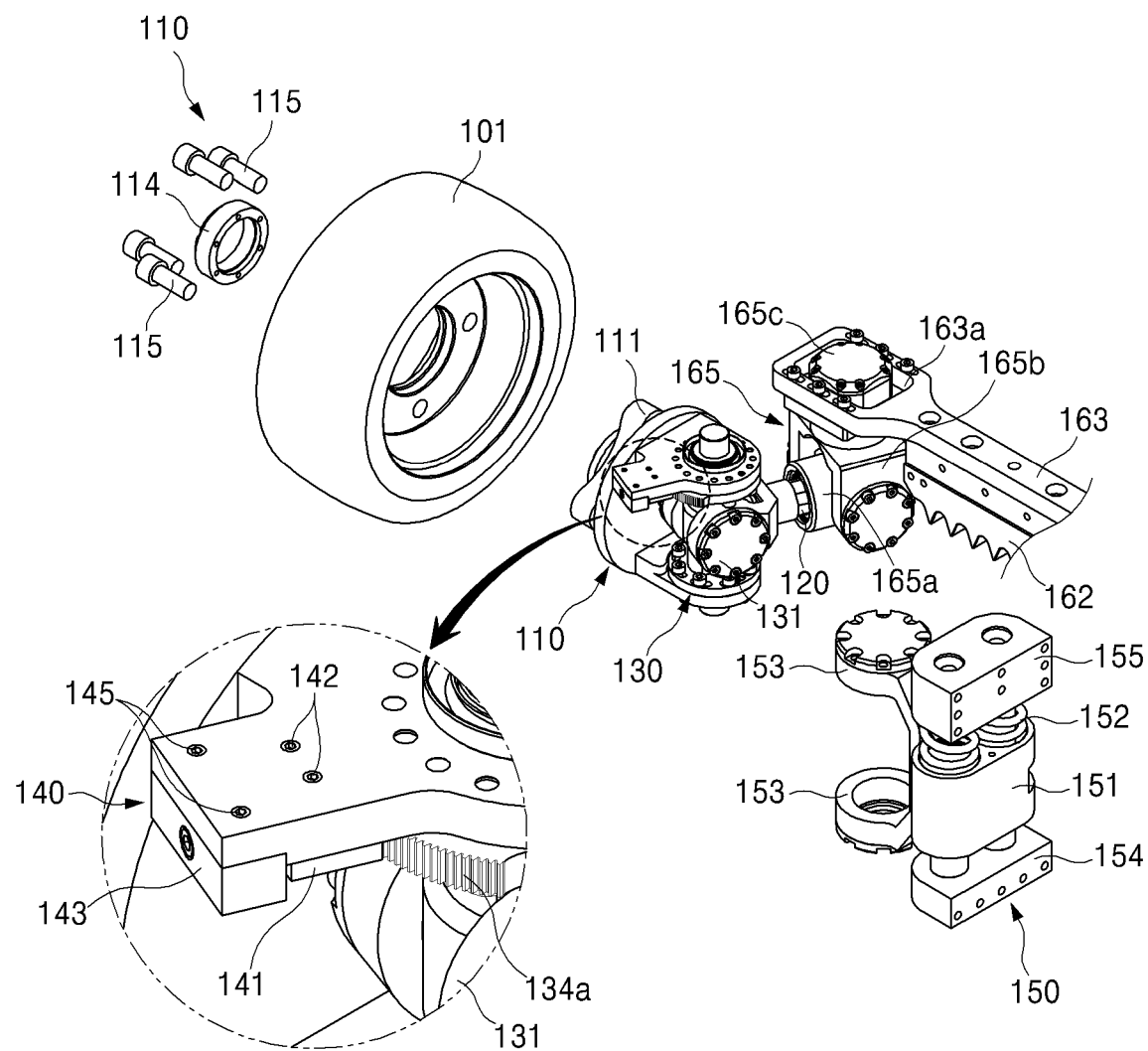
FIG. 14 is a detailed exploded view of FIG. 13.
Figure 15:
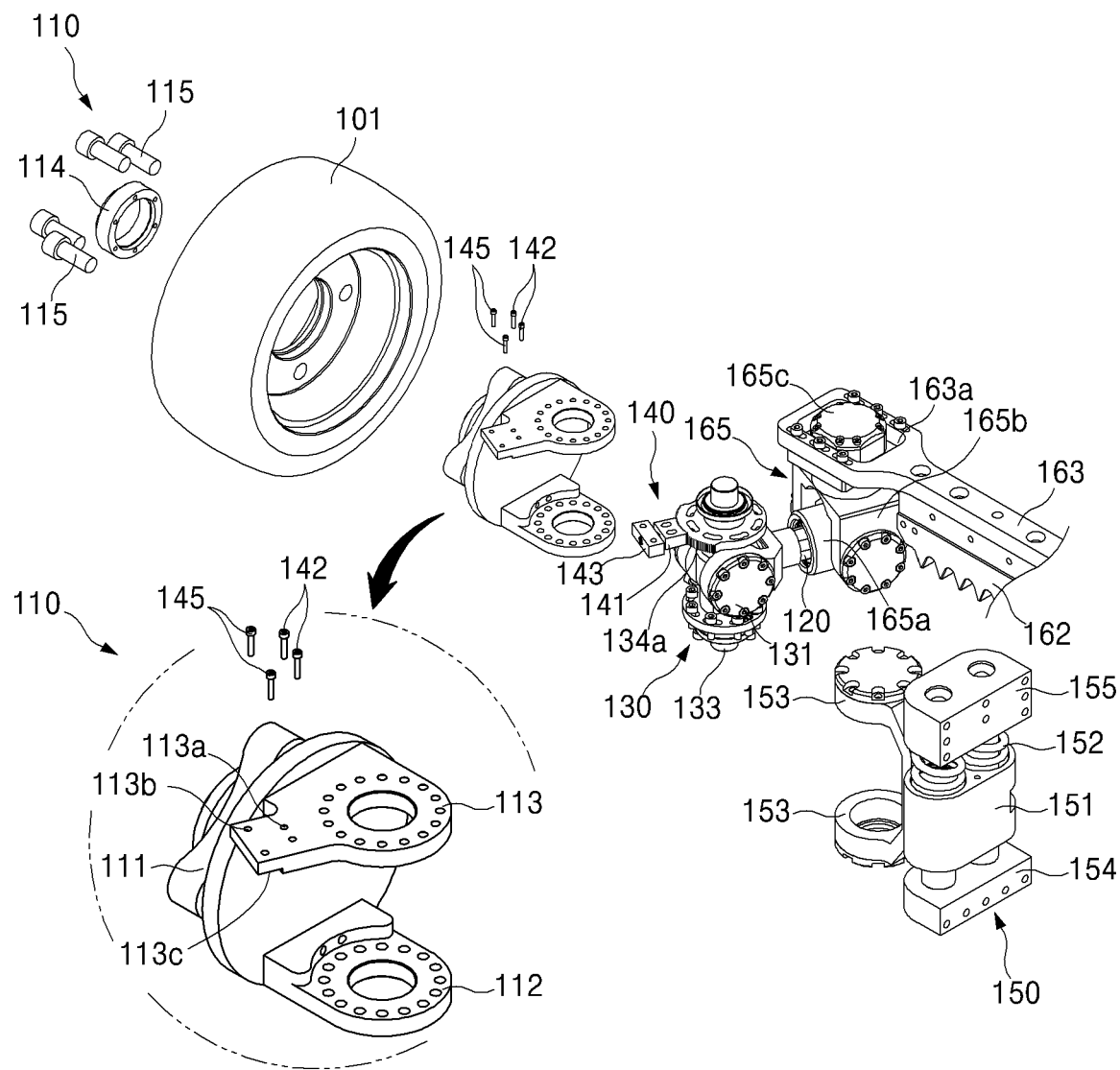
FIG. 15 is a detailed exploded view of FIG. 14.
Figure 16:
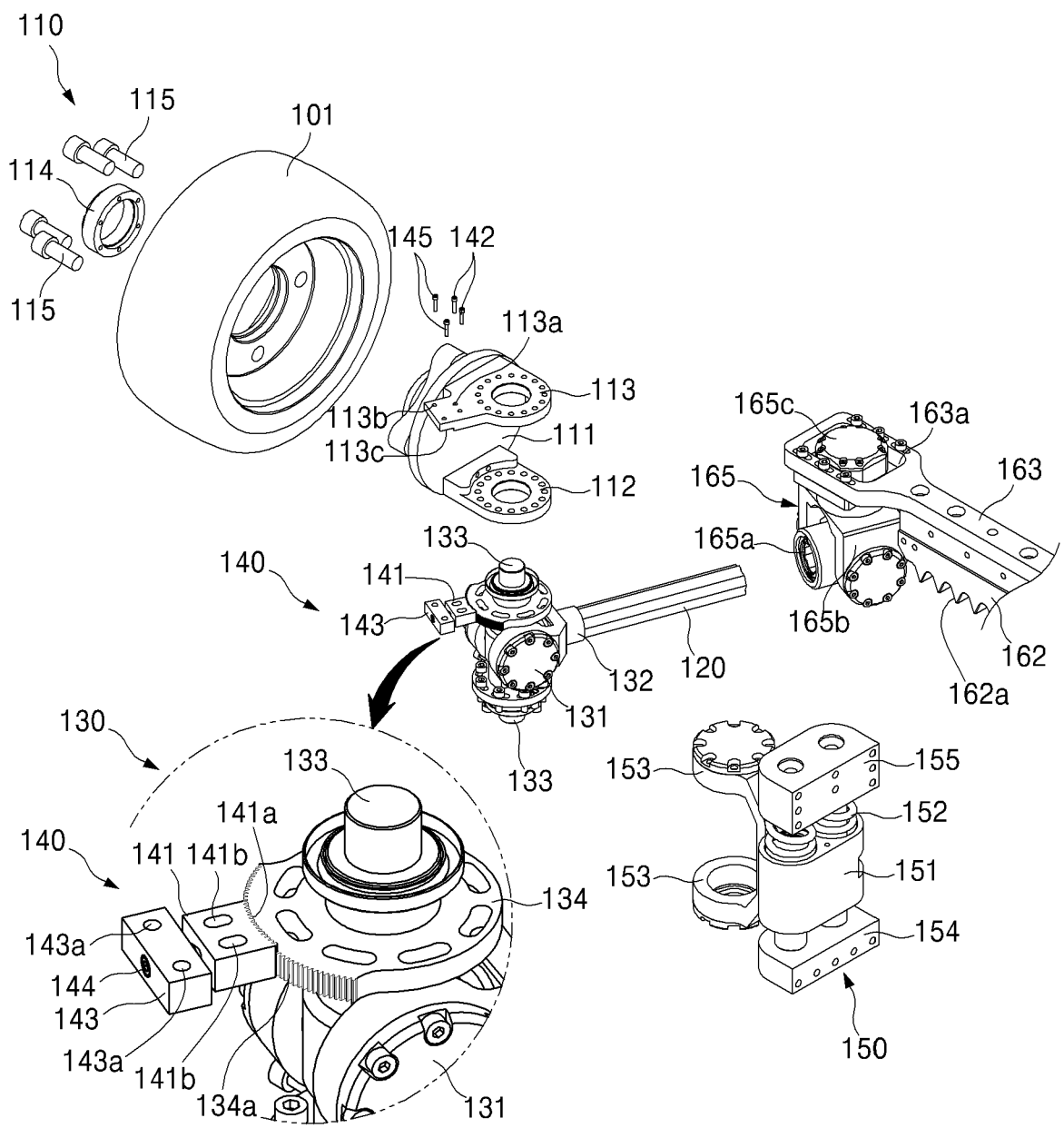
FIG. 16 is a detailed exploded view of FIG. 15.
Figure 17:
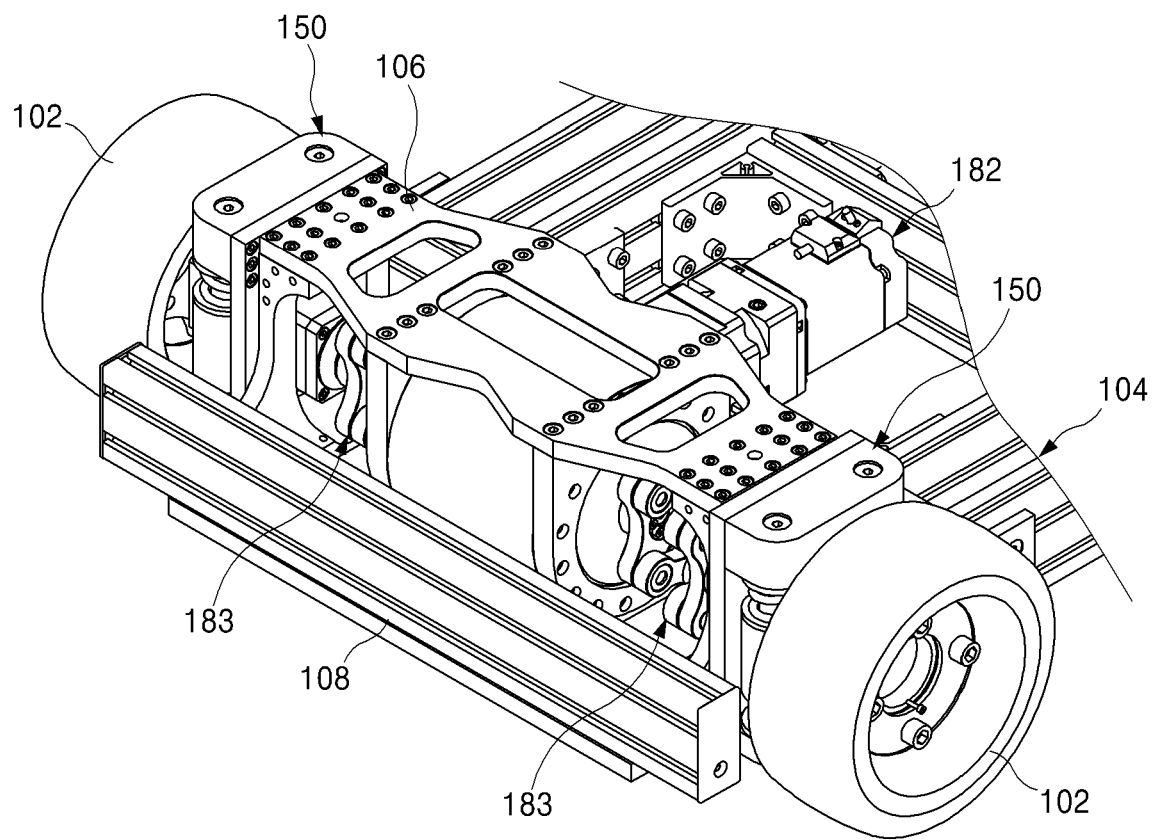
FIG. 17 is an enlarged view of a region C of FIG. 4.
Figure 18:
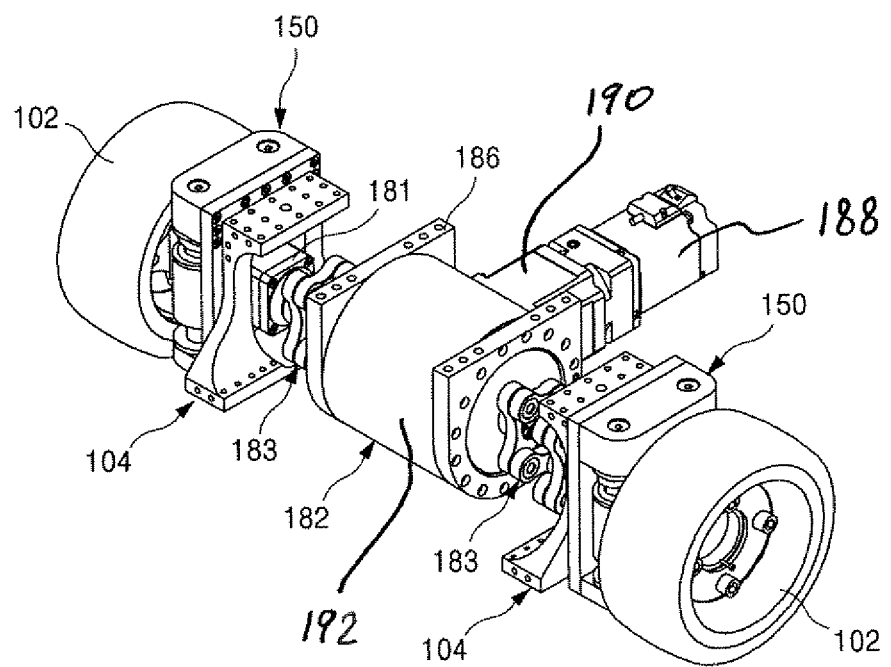
FIG. 18 is a detailed view of a region of a rear wheel driving portion of FIG. 17.
Figure 19:
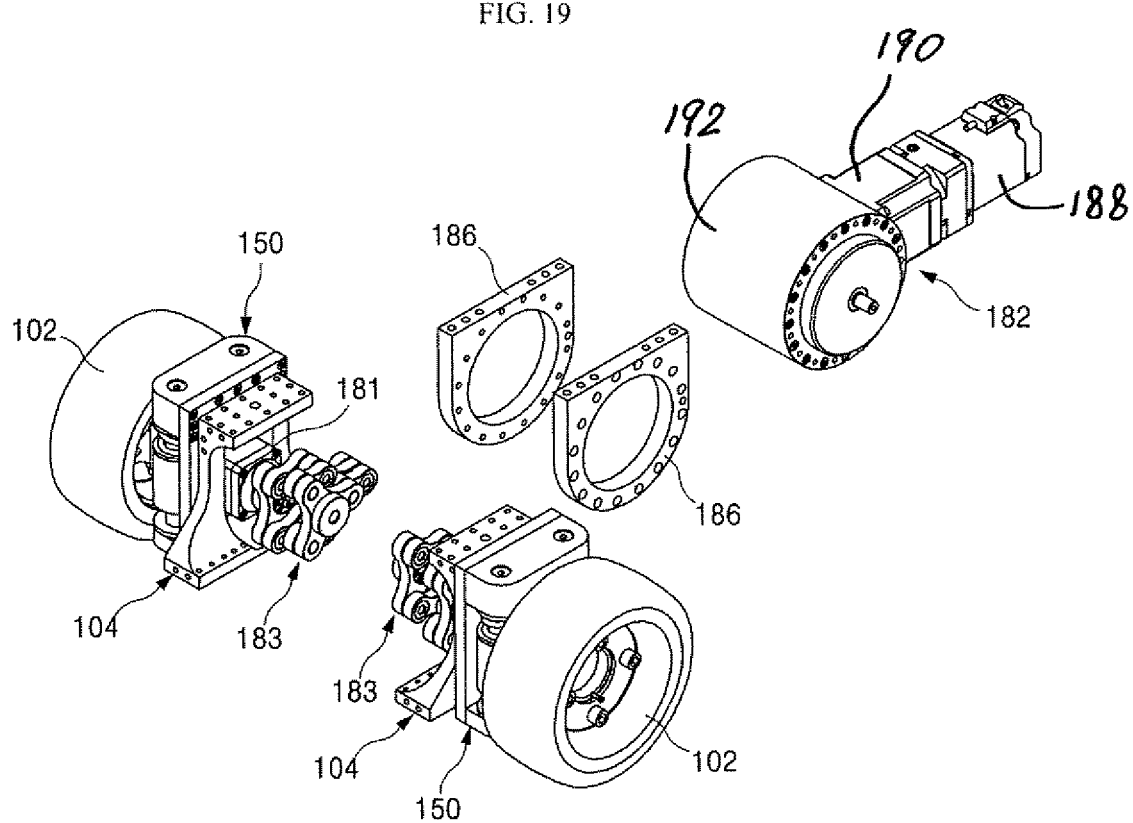
FIG. 19 is an exploded view of FIG. 18.

FIG. 3 is a perspective view of an autonomous driving vehicle according to an embodiment of the inventive concept. FIG. 4 is a rear perspective view of FIG. 3. FIG. 5 is a plan view of FIG. 3. FIG. 6 is a plan view in which, in FIG. 5, to emphasize the knuckle arm, the other parts except a knuckle arm are indicated by dashed lines. FIG. 7 is an enlarged view of a region A of FIG. 3. FIG. 8 illustrates the opposite side after removing parts of a body frame are removed in FIG. 7. FIG. 9 illustrates a state of removing a linear guide in FIG. 8. FIG. 10 illustrates the opposite side of FIG. 9. FIG. 11 is a partially exploded view of FIG. 10. FIG. 12 is an exploded view of a pinion and a rack in FIG. 11. FIG. 13 is a partially exploded enlarged view of a region B of FIG. 9. FIG. 14 is a detailed exploded view of FIG. 13. FIG. 15 is a detailed exploded view of FIG. 14. FIG. 16 is a detailed exploded view of FIG. 15. FIG. 17 is an enlarged view of a region C of FIG. 4. FIG. 18 is a detailed view of a region of a rear wheel driving portion of FIG. 17. FIG. 19 is an exploded view of FIG. 18.

Referring to these drawings, in an autonomous driving vehicle 100 according to the present embodiment, as an inclination angle set operation of a knuckle arm 120 with respect to a vehicle width W or a vehicle length L may be accurately, easily, and quickly performed, compared with the related art, not only mass production of vehicles may be achieved, but also a path deviation error during autonomous steering and driving may be reduced.

In other words, as mentioned above, the inclination angle set operation of the knuckle arm 120 (hereinafter, referred to as the setting operation) in the existing vehicle is carried out by a fine screw adjustment method using a double nut that is not illustrated, and thus, a working time is inevitably slow.

As such, when a time for the inclination angle setting operation of the knuckle arm 120 increases, the mass production of the autonomous driving vehicle 100 may be difficult to achieve, and thus, actual production becomes impossible.

However, in the case of the present embodiment, as described below, the inclination angle setting operation of the knuckle arm 120 may be conveniently performed by a serration method (see 134a and 141a of FIG. 16), and thus, the working time may be greatly reduced. Accordingly, mass productivity of the autonomous driving vehicle 100 is increased so that it is enough to secure competitiveness.

In order to provide such an effect, there must be no change in the length of the vehicle width W or the vehicle length L, and to this end, as in the present embodiment, a power transmission structure for steering, driving, or shock absorption of the autonomous driving vehicle 100 needs to be set to perform a linear motion without a link motion. With the above structure, the actual structure and operation of the inclination angle setting operation of the knuckle arm 120 are described below in detail.

Meanwhile, the autonomous driving vehicle 100 according to the present embodiment that can provide the above effect includes a body frame 104, and a front wheel 101 and a rear wheel 102, each being provided in a pair and rotatably coupled respectively to the front end and rear end of the body frame 104, and has a shape in which a structure, a unit, or an apparatus, such as a knuckle arm angle adjustment assembly 130, is connected to the front wheel 101 and the rear wheel 102 by means of the body frame 104.

First, the body frame 104 is a structure that supports all components, units, or apparatuses, including the front wheel 101 and the rear wheel 102, forming the autonomous driving vehicle 100. The body frame 104 may include a metal frame that is light and exhibits excellent stiffness.

While a body frame is illustrated as having a reference numeral 104 in the drawings, the body frame 104 may be one large integral mass structure, or a partially screw-assembled structure.

In particular, as it is sufficient that the body frame 104 supports all components, units, or apparatuses, including the front wheel 101 and the rear wheel 102, forming the autonomous driving vehicle 100, the body frame 104 needs not necessarily have the same shape as the shape in the drawings. In other words, the right scope of the present inventive concept is not limited to the shape in the drawings.

The front wheel 101 is provided with a front wheel support 110 that is connected to front wheel 101 as one body and supports the front wheel 101.

As illustrated in detail in FIGS. 14 to 16, while rotatably supporting the front wheel 101, the front wheel support 110 may enable the knuckle arm angle adjustment assembly 130, a module restriction portion 140, a vertical driving suspension 150, and the like to be stably mounted thereon.

The front wheel support 110 may include a support inner body 111 disposed inside the front wheel 101, a support outer body 114 supporting the front wheel 101 at a side opposite to the support inner body 111 with the front wheel 101 therebetween, and a plurality of body fastening members 115 for fastening the support outer body 114 and the support inner body 111.

Accordingly, as the support inner body 111 is disposed inside the front wheel 101 and the support outer body 114 is disposed outside the front wheel 101, and the support outer body 114 and the support inner body 111 are connected as one body by using the body fastening members 115 for fastening, the front wheel support 110 may be easily installed on the front wheel 101. Disassembly may be performed in the opposite method.

A lower shaft coupling portion 112 and a upper shaft coupling portion 113 are coupled to the support inner body 111. The lower shaft coupling portion 112 and the upper shaft coupling portion 113 form an integral structure with the support inner body 111.

The lower shaft coupling portion 112 is connected to a lower portion of one side of the support inner body 111, and forms a place for coupling a lower end portion of a rotation shaft 133 forming the knuckle arm angle adjustment assembly 130.

The upper shaft coupling portion 113 is connected to an upper portion of the one side of the support inner body 111, and forms a place for coupling an upper end portion of the rotation shaft 133.

As such, as the front wheel support 110 is assembled to the front wheel 101, and the knuckle arm angle adjustment assembly 130 is connected through the lower shaft coupling portion 112 and the upper shaft coupling portion 113 of the front wheel support 110, the front wheel support 110, the knuckle arm angle adjustment assembly 130, and the front wheel 101 may have a structure connected in one mass.

Meanwhile, a knuckle arm 120 drivingly coupled to and moving with the front wheel 101 during steering the front wheel 101 is connected to one side of the knuckle arm angle adjustment assembly 130, and the knuckle arm 120 is coupled to one side of the front wheel support 110 such that angle adjustment is possible for the inclination angle setting of knuckle arm 120.

In the present embodiment, the knuckle arm angle adjustment assembly 130 may be a sawtoothed knuckle arm angle adjustment assembly that is angle-adjustable by a preset angle with respect to the front wheel support 110 through a sawtooth method, that is, the serration method (see 134a and 141a of FIG. 16).

As in the present embodiment, when the knuckle arm angle adjustment assembly 130 of a sawtooth type is employed, compared with the existing fine screw adjustment method using a double nut, the inclination angle setting operation of the knuckle arm 120 may be easily and quickly performed and also the angle adjustment may be further accurately performed.

As mainly illustrated in detail in FIGS. 15 and 16, the knuckle arm angle adjustment assembly 130 of a sawtooth type may include an assembly body 131, the rotation shaft 133 forming the rotation axis of the assembly body 131, an angle adjustment module 134 connected to the rotation shaft 133, forming one body with the rotation shaft 133, and having a first serration 134a at one side thereof, and the module restriction portion 140 that restricts the angle adjustment module 134 to the one side of the front wheel support 110.

The assembly body 131 forms the frame of the knuckle arm angle adjustment assembly 130 of a sawtooth type. Structures such as the rotation shaft 133, the angle adjustment module 134, and the like are mounted, by locations, on the assembly body 131.

An arm connection portion 132 to which the knuckle arm 120 is connected is formed on the assembly body 131. The knuckle arm 120 having a non-circular cross-sectional structure has one end portion connected to the arm connection portion 132 and the other end portion connected to an arm penetration support portion 165a of a knuckle arm support unit 165 to be exposed. Accordingly, when the knuckle arm support unit 165 is operated, the knuckle arm 120 rotates and then the front wheel 101 may be steered.

While the rotation shaft 133 forms the rotation axis of the assembly body 131, both end portions of the rotation shaft 133 are coupled to the assembly body 131 to be exposed to the outside.

As both end portions of the rotation shaft 133 are exposed to the outside of the assembly body 131 as in the present embodiment, the vertical driving suspension 150 and the front wheel support 110 may be assembled to both end portions of the rotation shaft 133. Accordingly, these components may be connected to each other as one body with the front wheel 101.

The angle adjustment module 134 has a structure to be connected to the rotation shaft 133 and forming one body with the rotation shaft 133. The first serration 134a is formed at one side of the angle adjustment module 134.

The inclination angle setting operation of the knuckle arm 120 is briefly described with reference to FIG. 16. In the case of the present embodiment, while a second serration 141a of a module restriction main block 141 forming the module restriction portion 140 is engaged, in a screw type, with the first serration 134a of the angle adjustment module 134, the module restriction main block 141 is fastened to the upper shaft coupling portion 113 of the front wheel support 110. Thus, after the module restriction main block 141 is released and the angle adjustment module 134 that forms one body with the rotation shaft 133 is rotated by a desired angle, the module restriction main block 141 is fixed to the upper shaft coupling portion 113 of the front wheel support 110 such that the first and second serrations 134a and 141a are restricted with each other, thereby very simply performing the inclination angle setting operation of the knuckle arm 120.

In particular, as it is possible to perform the inclination angle setting operation of the knuckle arm 120 by rotating, by one pitch, the angle adjustment module 134 through the first and second serrations 134a and 141a, the inclination angle setting operation of the knuckle arm 120 with respect to the vehicle width W or the vehicle length L may be quickly and precisely performed.

In the module restriction portion 140 forming the knuckle arm angle adjustment assembly 130 of a sawtooth type, the module restriction portion 140 serves to restrict the angle adjustment module 134 to one side of the front wheel support 110.

The module restriction portion 140 may include the module restriction main block 141 having the second serration 141a that is engaged with the first serration 134a of the angle adjustment module 134, and a plurality of main fastening members 142 for fastening the module restriction main block 141 to the front wheel support 110.

A module restriction sub-block 143 is provided at one side of the module restriction main block 141. The module restriction sub-block 143 serves to support the module restriction main block 141 at a side of the module restriction main block 141. The module restriction sub-block 143 and the module restriction main block 141 are fastened through a block fastening member 144 to form one body.

Although the angle adjustment module 134 may be supported by only the module restriction main block 141, without the module restriction sub-block 143, by further employing the module restriction sub-block 143, the angle adjustment module 134 may be supported with a more stable and strong force. The module restriction sub-block 143 may be fastened by a plurality of sub-fastening members 145 to the front wheel support 110.

First and second through-holes 113a and 113b through which the main fastening members 142 and the sub-fastening members 145 pass are formed in the upper shaft coupling portion 113 so that the module restriction main block 141 and the module restriction sub-block 143 are coupled to the upper shaft coupling portion 113 of the body frame 104.

In this state, the first and second fastening holes 141b and 143a, to which the main fastening members 142 and the sub-fastening members 145 having passed through the first and second through-holes 113a and 113b are fastened, are respectively formed in the module restriction main block 141 and the module restriction sub-block 143, and unlike the second fastening hole 143a, the first fastening hole 141b is provided as a slot. Accordingly, it is effective to adjust assembly tolerance between parts.

A step portion 113c is formed in a lower end portion of the upper shaft coupling portion 113 that is contacted by the module restriction main block 141 and the module restriction sub-block 143. As in an enlarged view of FIG. 14, as the module restriction sub-block 143 is disposed on the step portion 113c, the module restriction sub-block 143 is not pushed and stably supports the module restriction main block 141.

Meanwhile, as described above, in the case of the autonomous driving vehicle 100 according to the present embodiment, as a solution to remove a slipping phenomenon of the Ackermann-Jantoud type illustrated in FIG. 1, the power transmission structure for steering, driving, or shock absorption of the autonomous driving vehicle 100 is employed to perform a linear motion without a link motion, which is described below.

A steering motor 161 for generating a driving force for steering the front wheel 101 is provided in the autonomous driving vehicle 100 according to the present embodiment.

To provide the driving force of the steering motor 161 to the pair of front wheels 101, the autonomous driving vehicle 100 according to the present embodiment employs a pinion 170 and a rack 162, and a motion transmitting member 163 is connected to the rack 162 and the knuckle arm support unit 165 for supporting the knuckle arm 120 is connected to the motion transmitting member 163.

Accordingly, when the steering motor 161 drives to rotate the pinion 170, a rotational motion of the pinion 170 is transmitted as linear motions of the rack 162 and the motion transmitting member 163, and through an operation of pulling or pushing, by the motion transmitting member 163, the knuckle arm support unit 165, the knuckle arm 120 supported on the knuckle arm support unit 165 is turned so that the front wheel 101 may be steered, which is described in detail.

The steering motor 161 generates a driving force to steer the front wheel 101. The pinion 170 is connected to the steering motor 161. In the present embodiment, as the steering motor 161 is fixedly mounted on the body frame 104, the pinion 170 rotates in place.

The pinion 170 has a structure to be connected to the steering motor 161 and rotated by the steering motor 161. The rack 162 is gear-engaged with the pinion 170, and serves to transmit the rotational motion of the pinion 170 as a linear motion.

Although a typical pinion of a spur gear shape may be employed, in the case of the present embodiment, the pinion 170 having a structure described below is employed. In other words, the pinion 170 employed in the present embodiment includes a pinion body 171 having a disc shape, and a plurality of power transmission pins 172 connected to the pinion body 171 at equal intervals in the circumferential direction of the pinion body 171, and providing rotational power mutually corresponding to the shape of teeth 162a formed on the rack 162.

In this state, the power transmission pins 172 have an arrangement structure of a circular shape in the pinion body 171, and rotate mutually corresponding to the shapes of teeth 162a formed on the rack 162.

Accordingly, when the pinion 170 performs a rotational motion in place by the operation of the steering motor 161, the power transmission pins 172 of the pinion 170 are tooth-engaged with the teeth 162a formed on the rack 162, and thus, the rack 162 performs a linear motion. Then, the motion transmitting member 163 connected to the rack 162 as one body is guided by linear guides 168 restricted to the body frame 104 through a front frame cover 105, to perform a linear motion horizontally, that is, to the left and right. Accordingly, the knuckle arm 120 is turned to the left and right through the knuckle arm support unit 165 connected to each of both end portions of the motion transmitting member 163, so as to move the front wheel 101, that is, to be steered.

For reference, the linear guides 168 are fixed to the front frame cover 105 with a motor support 169 for fixing the steering motor 161, and the front frame cover 105 has a shape to be connected to the body frame 104. As such, in a state in which the linear guides 168 are position-fixed to the body frame 104 having a position fixed structure, the motion transmitting member 163 is connected to the linear guides 168 and guided thereby so that the horizontal linear motion of the motion transmitting member 163 may be stably performed.

As described above, the knuckle arm support unit 165 for supporting the knuckle arm 120 is provided in the area of the front wheel 101. The knuckle arm support unit 165 may include the arm penetration support portion 165a through which the knuckle arm 120 passes and is supported thereon, a unit supporter 165b supporting the arm penetration support portion 165a outside the arm penetration support portion 165a, and a rotating head portion 165c rotatably connected to the unit supporter 165b and disposed in and fixed to a penetration portion 163a formed in an end portion of the motion transmitting member 163. As the knuckle arm 120 and the arm penetration support portion 165a have a non-circular sectional coupling structure, the knuckle arm 120 does not idle in the arm penetration support portion 165a.

The motion transmitting member 163 is connected to the rack 162 described above, forming one body. In other words, the motion transmitting member 163 is coupled to the rack 162 with both end portions thereof rotatably connected to the pair of knuckle arm support units 165, and serves to transmit the linear motion of the rack 162 as a turning motion of the knuckle arm 120.

As such, as the present embodiment adopts a linear turning and rolling motion method in which the linear motion of the motion transmitting member 163 turns the knuckle arm 120 to steer the front wheel 101, no link structure is needed unlike the related art, and thus, a change in the vehicle width W or the vehicle length L may be removed, and furthermore, may contribute to reduction of occurrence of sliding abrasion.

Figure 2:
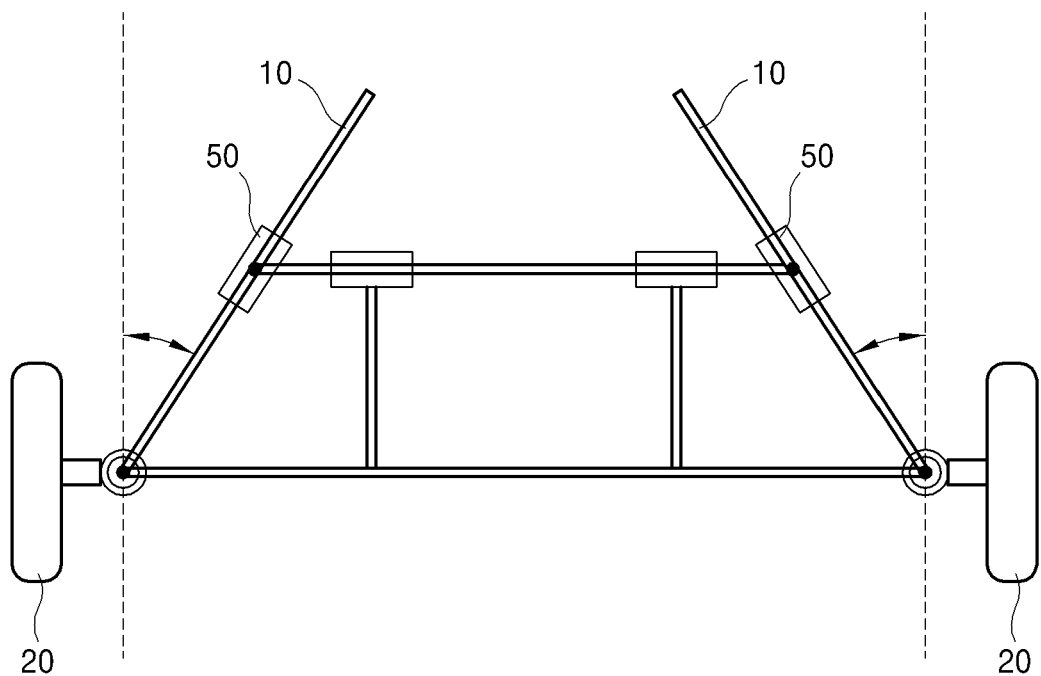
FIG. 2 is a schematic structural diagram of a steering system of a Davis type.

Meanwhile, as the same concept, when an inclined suspension like the suspension applied to the vehicle of FIGS. 1 and 2 is employed to remove vibrations and the like applied to a body of a vehicle, this may also affect the occurrence of a change in the vehicle width W or the vehicle length L. Accordingly, in the present embodiment, the vertical driving suspension 150 is employed to prevent an effect on the occurrence of a change in the vehicle width W or the vehicle length L.

The vertical driving suspension 150 for providing a shock-absorption function to a vehicle is connected to the assembly body 131 through the rotation shaft 133 of the knuckle arm angle adjustment assembly 130, and provides a shock-absorption force to the body of a vehicle while performing a linear motion only in a vertical direction to remove the occurrence of a change in the vehicle width W or the vehicle length L, in particular a change in the vehicle width W. The vertical driving suspension 150 may be independently mounted on all of the pair of front wheels 101 and the pair of rear wheels 102.

The vertical driving suspension 150 may include a suspension body 151, springs 152 coupled to the suspension body 151 and perform shock-absorption in the vertical direction, a pair of coupling arms 153 extending from the suspension body 151 and coupled to both end portions of the assembly body 131, a lower head 154 connected to a lower portion of the suspension body 151 apart therefrom and coupled to the body frame 104, and an upper head 155 connected to an upper portion of the suspension body 151 apart therefrom and restricted to the front frame cover 105 that is coupled to the body frame 104.

Referring to back FIGS. 3 and 4 and FIGS. 17 to 19, the autonomous driving vehicle 100 according to the present embodiment is equipped with, as means for driving a vehicle, a pair of rear wheel driving portions 181, a common driving force providing portion 182, and a rear wheel motion transmitting portion 183.

Each of the rear wheel driving portions 181 is connected to the rear wheel 102, and provides a driving force to the rear wheel 102.

The common driving force providing portion 182 provides a driving force for driving the rear wheel driving portions 181 for common use. The common driving force providing portion 182 is connected to a motion transmitting portion 183 by being supported by a supporter 186. The supporter 186 is connected to the body frame 104 through a rear frame cover 106. As a result, the common driving force providing portion 182 may be stably position-fixed to the body frame 104.

In the present embodiment, the common driving force providing portion 182 is provided as a modular composite device of an engine 188 for generating a driving force, a reducer 190 for reducing the speed of the engine 188, and a differential gear 192. As such, when the common driving force providing portion 182 with integrated functions is employed, modularized components may facilitate assembly and maintenance/repair, in particular miniaturization.

The rear wheel motion transmitting portion 183 is connected between the common driving force providing portion 182 and each of the rear wheel driving portions 181, and transmits the motion of the common driving force providing portion 182 to each of the rear wheel driving portions 181.

In the present embodiment, the rear wheel motion transmitting portion 183 adopts a Schmidt coupling. The Schmidt coupling efficiently guarantees continuity in power transmission, and accurately transmits a motion and torque even when a large magnitude of eccentricity occurs. In other words, the Schmidt coupling has a merit in that, even when a large magnitude of eccentricity is absorbed, left-and-right distances from the relative axis do not change. By employing the Schmidt coupling as the rear wheel motion transmitting portion 183, there is no need to use a universal joint and the like to the rear axle as in the related art.

Hereinafter, the inclination angle setting operation of the knuckle arm 120 is described.

First, by releasing the main fastening members 142 and the sub-fastening members 145, the restrictions of the module restriction main block 141 and the module restriction sub-block 143 are removed. When the restrictions of the module restriction main block 141 and the module restriction sub-block 143 are removed, the screw-engagement between the first and second serrations 134a and 141a is removed, and in this state, the rotation shaft 133 of the assembly body 131 is rotated by a desired angle through the angle adjustment module 134.

As described above, as the first serration 134a is formed in the angle adjustment module 134, the inclination angle setting operation of the knuckle arm 120 may be performed by rotating the rotation shaft 133 by one pitch.

Next, after tuning the inclination angle of the knuckle arm 120, the second serration 141a of the module restriction main block 141 is screw-engaged with the first serration 134a of the angle adjustment module 134, the module restriction sub-block 143 is disposed at the side of the module restriction main block 141 and the module restriction main block 141 and the module restriction sub-block 143 are fixed by using the body fastening members 115.

Then, by passing the main fastening members 142 and the sub-fastening members 145 respectively through the first and second through-holes 113a and 113b of the upper shaft coupling portion 113 to be fastened to the first and second fastening holes 141b and 143a of the module restriction main block 141 and the module restriction sub-block 143, the inclination angle setting operation of the knuckle arm 120 with respect to the vehicle width W or the vehicle length L may be quickly and precisely performed.

According to the present embodiment as operating with the structure described above, the inclination angle set operation of the knuckle arm 120 with respect to the vehicle width W or the vehicle length L may be accurately, easily, and quickly performed, compared with the related art, not only mass production of vehicles may be achieved, but also a path deviation error during autonomous steering and driving may be reduced.

While the present inventive concept has been described with respect to specific embodiments thereof, it will be apparent to those skilled in the art that various changes and modifications may be made without departing from the spirit and scope of the invention as defined in the following claims.

The present inventive concept may be used for the field of autonomous driving vehicles.

The invention claimed is:

1. An autonomous driving vehicle comprising:
a front wheel support connected to a front wheel as one body and supporting the front wheel; and
a knuckle arm angle adjustment assembly having one side to which a knuckle arm is connected, the knuckle arm coupled to the front wheel for steering the front wheel, and the knuckle arm angle adjustment assembly being coupled to one side of the front wheel support to be capable of angle adjustment for setting an inclination angle of the knuckle arm;
the knuckle arm angle adjustment assembly comprising a serrated knuckle arm angle adjustment assembly that is capable of angle adjustment by a preset angle with respect to the front wheel support;
the serrated knuckle arm angle adjustment assembly comprising:
an assembly body including an arm connection portion to which the knuckle arm is connected;
a rotation shaft coupled to the assembly body to have both end portions of the rotation shaft exposed, and forming a rotation axis of the assembly body;

an angle adjustment module connected to the rotation shaft forming one body, and having a first serration formed on one side of the angle adjustment module; and a module restriction portion restricting the angle adjustment module to one side of the front wheel support;

the module restriction portion comprising a module restriction main block having a second serration that is engaged with the first serration of the angle adjustment module; and a main fastening member fastening the module restriction main block to the front wheel support.

2. The autonomous driving vehicle of claim 1, wherein the module restriction portion further comprises:

a module restriction sub-block supporting the module restriction main block at a side of the module restriction main block;

a block fastening member fastening the module restriction sub-block and the module restriction main block; and a sub-fastening member fastening the module restriction sub-block to the front wheel support.

3. The autonomous driving vehicle of claim 2, wherein the front wheel support comprises:

a support inner body disposed inside the front wheel;

a lower shaft coupling portion connected to a lower portion of one side of the support inner body, and to which a lower end portion of the rotation shaft is coupled;

an upper shaft coupling portion connected to an upper portion of the one side of the support inner body, and to which an upper end portion of the rotation shaft is coupled;

a support outer body supporting the front wheel at a side opposite to the support inner body with the front wheel therebetween; and a plurality of body fastening members fastening the support outer body and the support inner body.

4. The autonomous driving vehicle of claim 3, wherein first and second through-holes, through which the main fastening member and the sub-fastening member pass, are formed in the upper shaft coupling portion, and first and second fastening holes, through which the main fastening member and the sub-fastening member having passed through the first and second through-hole are fastened, are formed in the module restriction main block and the module restriction sub-block, the first fastening hole being provided as a slot.

5. The autonomous driving vehicle of claim 3, wherein a step portion is formed in a lower end portion of the upper shaft coupling portion that is contacted by the module restriction main block and the module restriction sub-block.

6. The autonomous driving vehicle of claim 1, further comprising:

a pair of rear wheel driving portions respectively connected to a pair of rear wheels disposed at a side opposite to the front wheel, and providing a driving force to the pair of rear wheels;

a common driving force providing portion commonly providing a driving force to drive the pair of rear wheel driving portions; and a rear wheel motion transmitting portion connected between the common driving force providing portion and each of the pair of rear wheel driving portions, and transmitting a motion of the common driving force providing portion to the pair of rear wheel driving portions.

7. The autonomous driving vehicle of claim 6, wherein the common driving force providing portion is provided as a modular composite device of an engine for generating a driving force, a reducer for reducing a speed of the engine, and a differential gear.

8. The autonomous driving vehicle of claim 6, wherein the rear wheel motion transmitting portion comprises a Schmidt coupling.

9. An autonomous driving vehicle comprising:

a front wheel support connected to a front wheel as one body and supporting the front wheel;

a knuckle arm angle adjustment assembly having one side to which a knuckle arm is connected, the knuckle arm coupled to the front wheel for steering the front wheel, and the knuckle arm angle adjustment assembly being coupled to one side of the front wheel support to be capable of angle adjustment for setting an inclination angle of the knuckle arm; and a vertical driving suspension connected to an assembly body through a rotation shaft of the knuckle arm angle adjustment assembly, and providing a shock-absorption force to a body of the autonomous driving vehicle by performing only a linear motion in a vertical direction to remove a change in a vehicle width;

the knuckle arm angle adjustment assembly comprising a serrated knuckle arm angle adjustment assembly that is capable of angle adjustment by a preset angle with respect to the front wheel support;

the serrated knuckle arm angle adjustment assembly comprising:

the assembly body including an arm connection portion to which the knuckle arm is connected;

a rotation shaft coupled to the assembly body to have both end portions of the rotation shaft exposed, and forming a rotation axis of the assembly body;

an angle adjustment module connected to the rotation shaft forming one body, and having a first serration formed on one side of the angle adjustment module; and a module restriction portion restricting the angle adjustment module to one side of the front wheel support.

10. The autonomous driving vehicle of claim 9, wherein the vertical driving suspension is independently mounted on the front wheel and a rear wheel disposed at a side opposite to the front wheel.

11. The autonomous driving vehicle of claim 9, wherein the vertical driving suspension comprises:

a suspension body;

a spring coupled to the suspension body and performing shock-absorption in the vertical direction;

a pair of coupling arms extending from the suspension body and coupled to both end portions of the assembly body;

a lower head connected to a lower portion of the suspension body apart therefrom and coupled to a body frame; and an upper head connected to an upper portion of the suspension body apart therefrom and restricted to a front frame cover coupled to the body frame.

12. The autonomous driving vehicle of claim 9, further comprising:

a steering motor generating a driving force to steer the front wheel;

a pinion connected to the steering motor and rotated by the steering motor; and a rack gear-engaged with the pinion, and transmitting a rotational motion of the pinion as a linear motion.

13. The autonomous driving vehicle of claim 12, further comprising:
- a pair of knuckle arm support units each supporting the knuckle arm in an area of the front wheel; and
- a motion transmitting member coupled to the rack such that both end portions of the motion transmitting member are rotatably connected to the pair of knuckle arm support units, and transmitting a linear motion of the rack as a turning motion of the knuckle arm.

14. The autonomous driving vehicle of claim 13, wherein the knuckle arm support unit comprises:
- an arm penetration support portion through which the knuckle arm passes and is supported thereon;
- a unit supporter supporting the arm penetration support portion; and
- a rotating head portion rotatably connected to the unit supporter and disposed and fixed to a penetration portion formed in an end portion of the motion transmitting member.

15. The autonomous driving vehicle of claim 14, wherein the pinion comprises:
- a pinion body having a disc shape; and
- a plurality of power transmission pins connected to the pinion body at equal intervals in a circumferential direction of the pinion body, and providing rotational power mutually corresponding to shapes of teeth formed on the rack.

\* \* \* \* \*